(12) United States Patent
Ono et al.

(10) Patent No.: US 6,928,079 B2
(45) Date of Patent: Aug. 9, 2005

(54) MULTIPLEXER CONTROLLING ABSORPTION OF DELAY FLUCTUATION ON INDIVIDUAL TRANSMISSION PATH

(75) Inventors: Kimihide Ono, Kawasaki (JP); Hideki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 836 days.

(21) Appl. No.: 09/803,790

(22) Filed: Mar. 12, 2001

(65) Prior Publication Data

US 2001/0046236 A1 Nov. 29, 2001

(30) Foreign Application Priority Data

May 26, 2000 (JP) ........................................ 2000-156442

(51) Int. Cl.⁷ ................................................ H04J 3/06
(52) U.S. Cl. .................... 370/395.1; 370/517
(58) Field of Search ............................... 370/468, 474, 370/395.1, 516, 517

(56) References Cited

U.S. PATENT DOCUMENTS 5,901,149 A * 5/1999 Itakura et al. .............. 370/468

FOREIGN PATENT DOCUMENTS

JP          10285170         10/1998

* cited by examiner

Primary Examiner—Chau Nguyen
Assistant Examiner—Robert W. Wilson
(74) Attorney, Agent, or Firm—Katten Muchin Zavis Rosenman

(57) ABSTRACT

A multiplexer is provided for making data into a plurality of cells and then for transmitting the plurality of cells through a cell transmission path. The multiplexer includes a first delay-fluctuation adding unit adding a first maximum value of delay fluctuation occurring when the multiplexer transmits the cell, to a predetermined area of the cell; a second delay-fluctuation adding unit adding a second maximum value of delay fluctuation occurring when the multiplexer reproduces the data from the cell, to the predetermined area; a storage unit storing the data; and a data-read control unit controlling reading the data stored in the storage unit by following a maximum value of delay fluctuation stored in the predetermined area. Accordingly, the multiplexer can control absorption of the delay fluctuation individually for each cell transmission path.

5 Claims, 11 Drawing Sheets

FIG.4

| D7 D6 D5 D4 D3 D2 D1 D0 | DEPTH SETTING |
|---|---|
| 0  0  0  0  0  0  0  0 | 1ms |
| 0  0  0  0  0  0  0  1 | 2ms |
| 0  0  0  0  0  0  1  0 | 3ms |
| 0  0  0  0  0  0  1  1 | 4ms |
| 1  1  1  1  1  1  1  0 | 255ms |
| 1  1  1  1  1  1  1  1 | 256ms |

MULTIPLEXER CONTROLLING ABSORPTION OF DELAY FLUCTUATION ON INDIVIDUAL TRANSMISSION PATH

BACKGROUND OF THE INVENTION

1. Field of the Invention

The present invention relates to a method and an apparatus for controlling absorption of delay fluctuation of data transmitted through a transmission path. The present invention more particularly relates to a method of individually controlling absorption of delay fluctuation of data transmitted through each transmission path and a multiplexer utilizing the method.

2. Description of the Related Art

Recently, a network utilizing a multiplex transmission of data such as images and sounds is found in an increasing number of areas. A type of a multiplexer used in such a network is moving from a time-division multiplexer (TDM) to a cell multiplexer utilizing a statistical multiplex. The time-division multiplexer includes a plurality of time slots in a frame, each timeslot being used for transmitting or receiving corresponding data. Such a time-division multiplexer is suitable for a periodic transmission or reception of information having a single destination address. In a network system such as a company-wide network system where sound quality is important, there is a demand for development of a cell multiplexer whose performance of transmitting or receiving a real-time sound signal is equal to that of the time-division multiplexer. However, in a cell multiplex system, there is a case in which delay fluctuation occurs at a cell multiplexer on a receiving end because of difference in the number of cells transmitted from a cell multiplexer on a transmitting end and in routes of transmitting cells. Such delay fluctuation is a cause of poor sound quality. Thus, the cell multiplexer necessarily includes a buffer for absorbing delay fluctuation of received cells.

FIG. 1 is a diagram showing a sound-signal transmission system including different paths for transmitting sound signals. The sound-signal transmission system shown in FIG. 1 includes cell multiplexers 3, 5, 7 and 10, transmission paths 4, 6, 8 and 9, private branch exchanges (PBX) 2 and 11, and telephone sets 1 and 12. In a case of transmitting an analog sound signal from the telephone set 1 to the telephone set 12, the PBX 2 converts the analog sound signal received from the telephone set 1 to a digital sound signal, and supplies the digital sound signal to the cell multiplexer 3. The cell multiplexer 3 executes a sound compression process and a cell assembly process on the digital sound signal supplied from the PBX 2, and selects a route used for transmitting the digital sound signal made into cells by following exchange information set in a exchange management setting table and speed information set in a scheduler.

In a case of selecting a sound transmission path 1 for transmitting the cells, the cell multiplexer 3 transmits the cells to the cell multiplexer 10 through the transmission path 9. On the other hand, in a case of selecting a sound transmission path 2, the cell multiplexer 3 transmits the cells to the cell multiplexer 10 through the transmission path 4, the cell multiplexer 5, the transmission path 6, the cell multiplexer 7 and the transmission path 8. At the cell multiplexers 3, 5, 7 and 10, delay fluctuation occurs on the cells based on internal processes of the cell multiplexers. Additionally, the transmission paths 4, 6, 8 and 9 cause delay fluctuation on the cells according to conditions of the transmission paths. By setting an amount of the delay fluctuation caused by the cell multiplexers 3, 5, 7 and 10 to "α", and an amount of the delay fluctuation caused by the transmission paths 4, 6, 8 and 9 to "β" a total amount of the delay fluctuation caused by the sound transmission path 1 becomes "2α+β". In addition, a total amount of the delay fluctuation caused by the sound transmission path 2 becomes "4α+3β".

Accordingly, the cell multiplexer 10 receiving the cells includes a received-cell buffer, and controls the received-cell buffer to absorb the delay fluctuation 4α+3β of the cells caused by the sound transmission path 2. Thus, the cell multiplexer 10 can also absorb the delay fluctuation caused by the transmission path 1 by use of the received-cell buffer. The cell multiplexer 10 then reproduces the digital sound signal by executing a cell disassembly process and a sound expansion process on the cells whose delay fluctuation has been absorbed, and supplies the digital sound signal to the PBX 11. The PBX 11 converts the digital sound signal supplied from the cell multiplexer 10 to the analog sound signal, and supplies the analog sound signal to the telephone set 12. Consequently, the analog sound signal is transmitted from the telephone set 1 to the telephone set 12.

A cell multiplexer on a receiving end includes a received-cell buffer and controls the received-cell buffer so that the received-cell buffer can absorb the maximum delay fluctuation of cells caused by a sound transmission path, thereby enabling absorption of delay fluctuation of the cells caused by other sound transmission paths. In order to absorb a greater amount of delay fluctuation, the cell multiplexer on the receiving end controls a depth of the received-cell buffer to be deeper. As a result of deepening the depth of the received-cell buffer, transmission delay corresponding to the depth of the received-cell buffer occurs in a signal transmission.

On the other hand, a cell multiplexer on a transmitting end selects a route used for transmitting the cells by following exchange information set in a exchange management setting table and speed information set in a scheduler. In other words, a route through which the cells are transmitted is not predetermined in a case in which there exists a plurality of routes for transmitting the cells. Consequently, the cell multiplexer on the receiving end controls the received-cell buffer so that the received-cell buffer can absorb the maximum delay fluctuation caused by a sound transmission path among sound transmission paths possibly selected. For instance, as shown in FIG. 1, in a case in which the cell multiplexer on the transmitting end selects the sound transmission path 1, the cell multiplexer on the receiving end controls the received-cell buffer so that the received-cell buffer can absorb the delay fluctuation "α+3β" caused by the sound transmission path 2, even though the amount of the delay fluctuation caused by the sound transmission path 1 is "2α+β". In such a case, the received-cell buffer included in the cell multiplexer on the receiving end causes extra transmission delay corresponding to an amount of delay fluctuation "2α+2β" in a transmission of the cells through the sound transmission path 1.

The transmission delay in a sound-signal transmission causes a sense of incongruity and decrease in sound quality in voice communication through a network. Thus, minimization of the transmission delay is desired in the sound-signal transmission in order to maximize the sound quality in the voice communication. However, by limiting a control of a received-cell buffer included in a cell multiplexer on a receiving end to a fixed setting for absorbing the maximum delay fluctuation caused by a sound transmission path, sound quality of a sound signal transmitted through a sound transmission path other than the sound transmission path causing the maximum delay fluctuation is decreased by the transmission delay corresponding to the maximum delay fluctuation caused by the received-cell buffer.

SUMMARY OF THE INVENTION

Accordingly, it is a general object of the present invention to provide a method and an apparatus for controlling absorption of delay fluctuation of data transmitted through a transmission path. A more particular object of the present invention is to provide a method of controlling absorption of delay fluctuation and a multiplexer utilizing the method of controlling absorption of delay fluctuation, the method being capable of setting a depth of a buffer used for absorbing delay fluctuation for each call automatically and instantly, thereby preventing decrease in a sound quality of the call.

The above-described object of the present invention is achieved by a multiplexer transmitting data as a cell through a cell transmission path, the multiplexer comprising a first delay-fluctuation adding unit adding a first maximum value of delay fluctuation occurring when the multiplexer transmits the cell, to a predetermined area of the cell: a second delay-fluctuation adding unit adding a second maximum value of delay fluctuation occurring when the multiplexer reproduces the data from the cell, to the predetermined area; a storage unit storing the data; and a data-read control unit controlling reading the data stored in the storage unit by following a maximum value of delay fluctuation stored in the predetermined area.

When receiving the cell from a previous multiplexer on the cell transmission path, the multiplexer adds a maximum value of delay fluctuation occurs at the multiplexer to the predetermined area of the cell, and transmits to the next multiplexer on the cell transmission path. A final multiplexer on the cell transmission path stores the data included in the cell in the storage unit, and then reads the data therefrom by following the maximum value of delay fluctuation stored in the predetermined area of the cell. Thus, the delay fluctuation of the data can be absorbed.

Other objects, features and advantages of the present invention will become more apparent from the following detailed description when read in conjunction with the accompanying drawings.

BRIEF DESCRIPTION OF THE DRAWINGS

FIG. 4 is a diagram showing a received buffer-depth control area included in a cell payload part of the cell;

DESCRIPTION OF THE PREFERRED EMBODIMENTS

A description will now be given of preferred embodiments of the present invention, with reference to the accompanying drawings.

Figure 1:
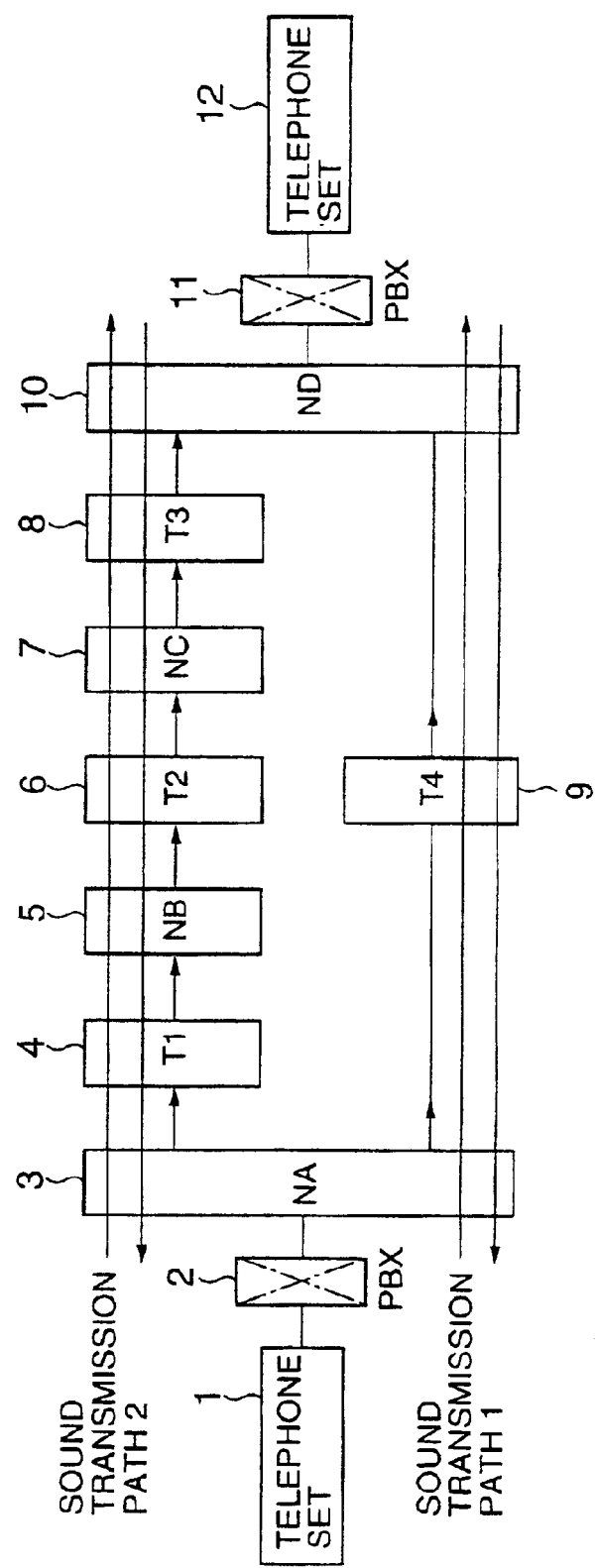
FIG. 1 is a diagram showing a sound-signal transmission system including different paths for transmitting sound signals.
Figure 2:
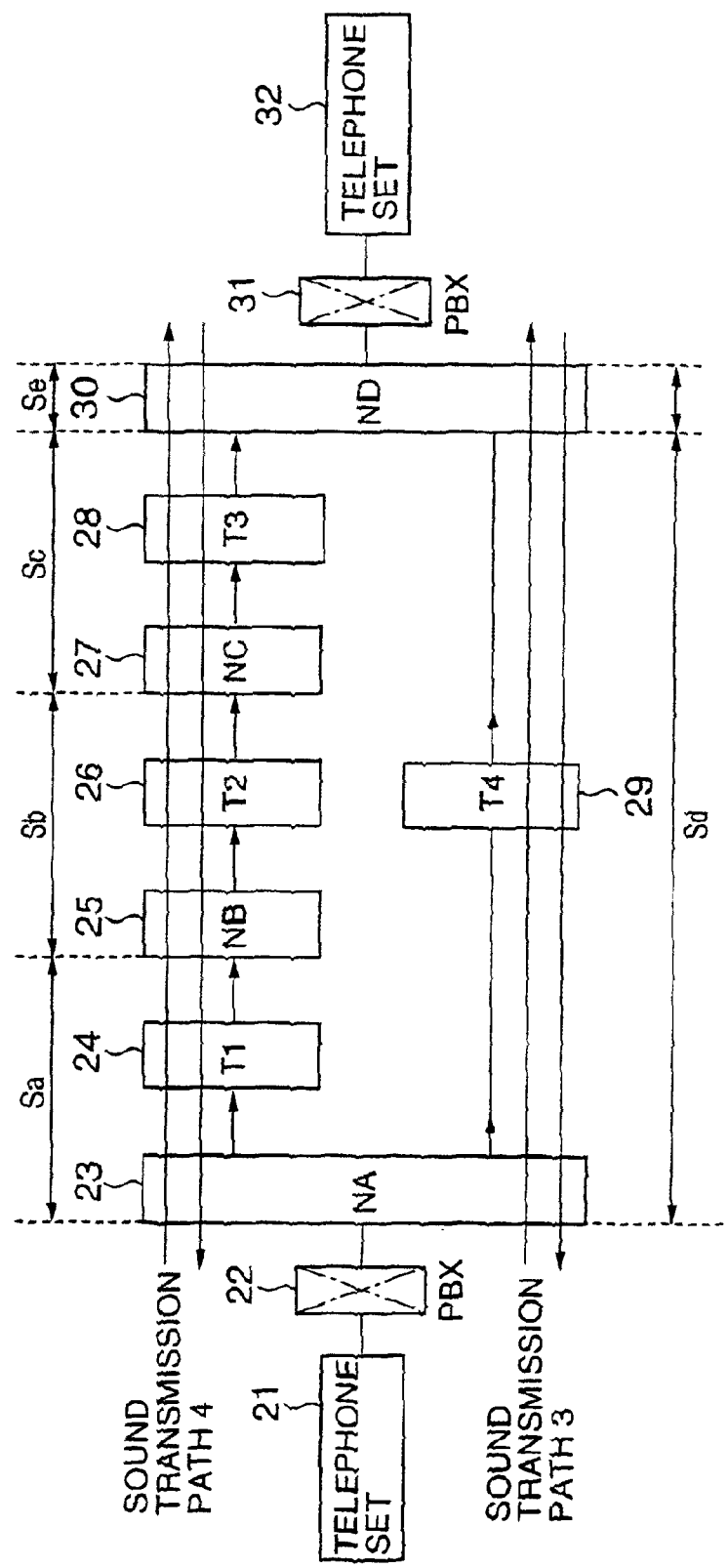
FIG. 2 is a diagram showing an embodiment of a sound-signal transmission network according to the present invention.

FIG. 2 is a diagram showing an embodiment of a sound-signal transmission network according to the present invention. The sound-signal transmission network shown in FIG. 2 includes cell multiplexers 23, 25, 27 and 30, transmission paths 24, 26, 28 and 29, private branch exchanges (PBX) 22 and 31, and telephone sets 21 and 32. Additionally, sound transmission paths 3 and 4 are shown in FIG. 2.

Figure 3:
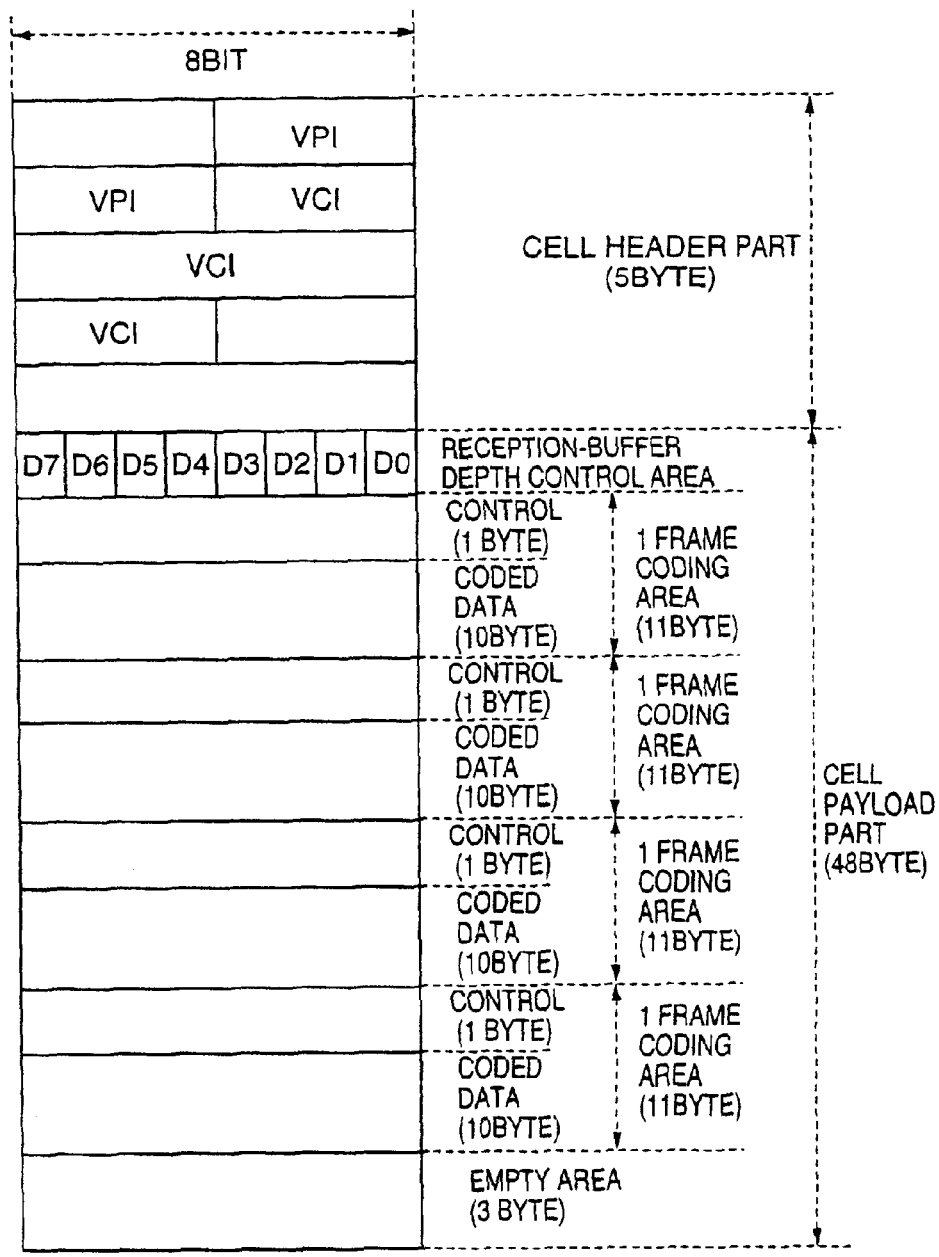
FIG. 3 is a diagram showing an embodiment of a format of a cell transmitted or received in the network shown in FIG. 2.

FIG. 3 is a diagram showing an embodiment of a format of a cell transmitted or received in the network shown in FIG. 2. A cell shown in FIG. 3 includes a 5-byte cell header part and a 48-byte cell payload part. The cell header part includes information such as a virtual path identifier (VPI) and a virtual channel identifier (VCI) used for selecting a communication path. Additionally, the cell payload part includes a plurality of coding areas, a received-buffer-depth control area whose size is one byte, and a 3-byte empty area. According to the present invention, a multiplexer can transmit a delay fluctuation value of delay fluctuation occurring at a cell transmission by use of the received-buffer-depth control area. To be concrete, in a case in which a size of the received-buffer-depth control area is one byte (8 bits), the received-buffer-depth control area can store one of 256 delay fluctuation values.

FIG. 4 is a diagram showing the received 20 buffer-depth control area. In the case in which the size of the received-buffer-depth control area is 8 bits, a delay fluctuation value, that is, a received-buffer depth, can be set to one of 1 millisecond through 256 milliseconds, each corresponding to bit lines ".00000000" through "11111111".

In a case of selecting the sound transmission path 3 as a route for transmitting a cell in the network shown in FIG. 2, the cell multiplexer 23 adds a maximum delay fluctuation value "Sd" of delay fluctuation occurring at the cell multiplexer 23 and the transmission path 29 to the received-buffer-depth control area of the cell, and then transmits the cell to the cell multiplexer 30. The cell multiplexer 30 receives the cell from the cell multiplexer 23, and adds a maximum delay fluctuation value "Se" of delay fluctuation occurring at the cell multiplexer 30 to the received-buffer-depth control area of the cell. Consequently, the cell multiplexer 30 can set a received-buffer depth to a level appropriate for the sound transmission path 3 by following a delay fluctuation value "Sd+Se" stored in the received-buffer-depth control area of the cell.

On the other hand, in a case of selecting the sound transmission path 4 as a route for transmitting a cell in the network shown in FIG. 2, the cell multiplexer 23 adds a maximum delay fluctuation value "Sa" of delay fluctuation occurring at the cell multiplexer 23 and the transmission path 24 to the received-buffer-depth control area of the cell, and then transmits the cell to the cell multiplexer 25. The cell multiplexer 25 adds a maximum delay fluctuation value "Sb" of delay fluctuation occurring at the cell multiplexer 25 and the transmission path 26 to the received-buffer-depth control area of the cell received from the cell multiplexer 23, and then transmits the cell to the cell multiplexer 27.

Similarly, the cell multiplexers 27 and 30 respectively add maximum delay fluctuation values "Sc"and "Se" to the received-buffer-depth control area of the cell. Consequently, the cell multiplexer 30 can set the received-buffer depth to a level appropriate for the sound transmission path 4 by following a delay fluctuation value "Sa+Sb+Sc+Se" stored in the received-buffer-depth control area of the cell.

Figure 5:
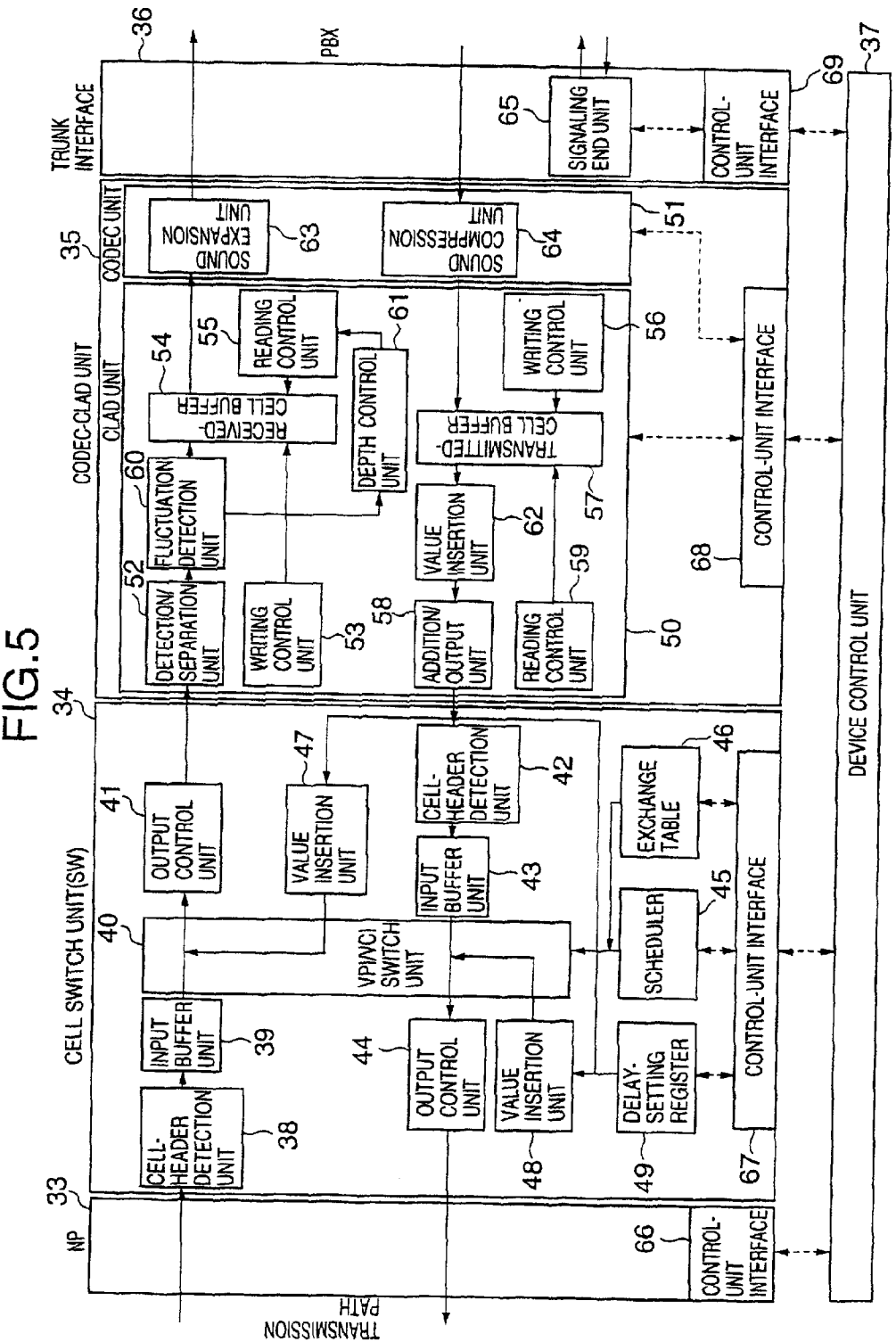
FIG. 5 is a block diagram showing an embodiment of a cell multiplexer according to the present invention.

A description will now be given of a cell multiplexer capable of adding a maximum delay fluctuation value to the received-buffer-depth control area of the cell whose format is shown in FIG. 3 with reference to FIG. 5. The cell multiplexer shown in FIG. 5 includes a digital-private-line interface (NP) 33, a cell switch unit (SW) 34, a coder/decoder and cell assembly/disassembly (CODEC-CLAD) unit 35, a trunk interface 36 and a device control unit 37. The NP 33 includes a control-unit interface 66, and is connected to a transmission path such as an integrated service digital network (ISDN) or an asynchronous transfer mode (ATM) network. The NP 33 supplies a cell received through the transmission path to the cell switch unit 34 as well as transmits a cell supplied from the cell switch unit 34 to the transmission path.

The cell switch unit 34 includes cell-header detection units 38 and 42, input buffer units 39 and 43, a VPI/VCI exchange and conversion output control switch (VPI/VCI switch) unit 40, output control units 41 and 44, a scheduler 45, an exchange management setting table (an exchange table) 46, cell fluctuation-value insertion units (value insertion units) 47 and 48, a transmission-path-delay setting register (a delay-setting register) 49 and a control-unit interface 67. The cell-header detection unit 38 detects reception of a cell by monitoring the cell header part of the cell supplied from the NP 33. The input buffer unit 39 stores detected cells by separating the detected cells for each of the VPI and the VCI. The input buffer unit 39 then supplies cells stored therein to the VPI/VCI switch unit 40 one by one. The VPI/VCI switch unit 40 switches a VPI/VCI connection of a cell supplied from the input cell buffer unit 39 by following VPI/VCI connection information set in the exchange management setting table 46, the VPI/VCI connection information indicating which VPI/VCI is connected to the VPIJ/VCI of the cell. Additionally, the VPI/VCI switch unit 40 adds a maximum delay fluctuation value to the received-buffer-depth control area of the cell by following a direction from the dell fluctuation-value insertion unit 47, the maximum delay fluctuation value being initially set in the transmission-path-delay setting register 49. The transmission-path-delay setting register 49 includes information such as maximum delay fluctuation values of possibly selected transmission paths and a maximum delay fluctuation value based on internal processes of the cell multiplexer, for each transmission path. After receiving the cell from the VPI/VCI switch unit 40, the output control unit 41 executes a buffering control for controlling an interval between each cell transmission, a cell output rate and the like by following an ATM network service category such as a constant bit rate (CBR) or a variable bit rate (VBR) set in the scheduler 45.

The CODEC-CLAD unit 35 includes a cell assembly and disassembly (CLAD) unit 50, a coder and decoder (CODEC) unit 51 and a control-unit interface 68. The CLAD unit 50 includes a cell-header detection and separation unit (a detection/separation unit) 52, a received-cell-buffer writing control unit (a writing control unit) 53, a received-cell buffer 54, a received-cell-buffer reading control unit (a reading control unit) 55, a transmitted-cell-buffer writing control unit (a writing control unit) 56, a transmitted-cell buffer 57, a cell-header addition and output unit (an addition/output unit) 58, a transmitted-cell-buffer reading control unit (a reading control unit) 59, a received-cell fluctuation detection unit (a fluctuation detection unit) 60, a received-cell-buffer depth-setting control unit (a depth control unit) 61 and a cell fluctuation-value insertion unit 35 (a value insertion unit) 62. The CODEC unit 51 includes a sound expansion unit 63 and a sound compression unit 64.

The cell-header detection and separation unit 52 receives the cell from the cell switch unit 34, separates the cell payload part of the cell, and supplies the cell payload part to the received-cell-fluctuation detection unit 60. The received-cell-fluctuation detection unit 60 separates the received-buffer-depth control area from the cell payload part supplied from the cell-header detection and separation unit 52, and supplies the received-buffer-depth control area to the received-cell-buffer depth-setting control unit 61 as well as the cell payload part to the received-cell buffer 54.

The received-cell-buffer writing control unit 53 controls timing to write data in the received-cell buffer 54. The received-cell-buffer depth-setting control unit 61 analyzes the maximum delay fluctuation value stored in the received-buffer-depth control area supplied from the received-cell-fluctuation detection unit 60, and sets a depth of the received-cell buffer 54. Additionally, the received-cell-buffer depth-setting control unit 61 notifies the received-cell-buffer reading control unit 55 of timing to read data from the received-cell buffer 54 by following the set depth. The received-cell-buffer reading control unit 55 controls the timing to read the cell payload part stored in the received-cell buffer 54. The timing supplied from the received-cell-buffer reading control unit 55 to the received-cell buffer 54 depends on the depth of the received-cell buffer 54 set by the received-cell-buffer depth-setting control unit 61. The deeper the depth of the received-cell buffer 54 is, the longer a period in which the cell payload part is stored in the received-cell buffer 54. In other words, the deeper the depth of the received-cell buffer 54 is set by the received-cell-buffer depth-setting control unit 61, the more tolerance against the delay fluctuation the cell multiplexer has.

The cell payload part read from the received-cell buffer 54 is then supplied to the sound expansion unit 63 of the CODEC unit 51. The sound expansion unit 63 executes an expansion process on compressed sound data included in the cell payload part, thereby reproducing a digital sound signal. Subsequently, the sound expansion unit 63 supplies the digital sound signal to the trunk interface 36.

The trunk interface 36 includes a signaling end unit 65 and a control-unit interface 69. The trunk interface 36 is connected to a PBX, and supplies the digital sound signal received from the CODEC-CLAD unit 35 to the PBX as well as supplies a digital sound signal received from the PBX to the CODEC-CLAD unit 35. Additionally, the trunk interface 36 ends signaling information supplied from the PBX by use of the signaling end unit 65, and supplies the signaling information to the device control unit 37 through the control-unit interface 69.

On the other hand, if the digital sound signal is supplied from the PBX to the cell multiplexer through the trunk interface 36, the sound compression unit 64 of the CODEC unit 51 executes a compression process on the digital sound signal supplied from the trunk interface 36, thereby creating compressed sound data. Subsequently, the sound compression unit 64 supplies the compressed sound data to the transmitted-cell buffer 57 of the CLAD unit 50. The transmitted-cell buffer 57 generates a cell payload part from the compress sound data supplied from the sound compression unit 64. Timing to write data in the transmitted-cell buffer 57 is controlled by the transmitted-cell-buffer writing control unit 56. The transmitted-cell-buffer reading control unit 59 controls timing to read data from the transmitted-cell buffer 57. Accordingly, the transmitted-cell buffer 57 supplies the cell payload part to the cell fluctuation-value insertion unit 62 by following the timing supplied from the transmitted-cell-buffer reading control unit 59.

The cell fluctuation-value insertion unit 62 adds the maximum delay fluctuation value based on the internal processes of the cell multiplexer to the received-buffer-depth control area of the cell payload part, and then supplies the cell payload part to the cell-header addition and output unit 58. The cell-header addition and output unit 58 adds a cell header part to the cell payload part supplied from the cell fluctuation-value insertion unit 62, and outputs a cell including the cell header part and the cell payload part to the cell-header detection unit 42 of the cell switch unit 34.

Processes executed by the cell switch unit 34 on the cell supplied from the CODEC-CLAD unit 35 is similar to the above-described processes executed on the cell supplied from the NP 33 to the cell-header detection unit 38 of the cell switch unit 34, and thus a description of such processes is omitted. The device control unit 37 controls each of the NP 33, the cell switch unit 34, the CODEC-CLAD unit 35 and the trunk interface 36 that are connected to the device control unit 37 respectively through the control-unit interfaces 66, 67, 68 and 69.

Figure 6:
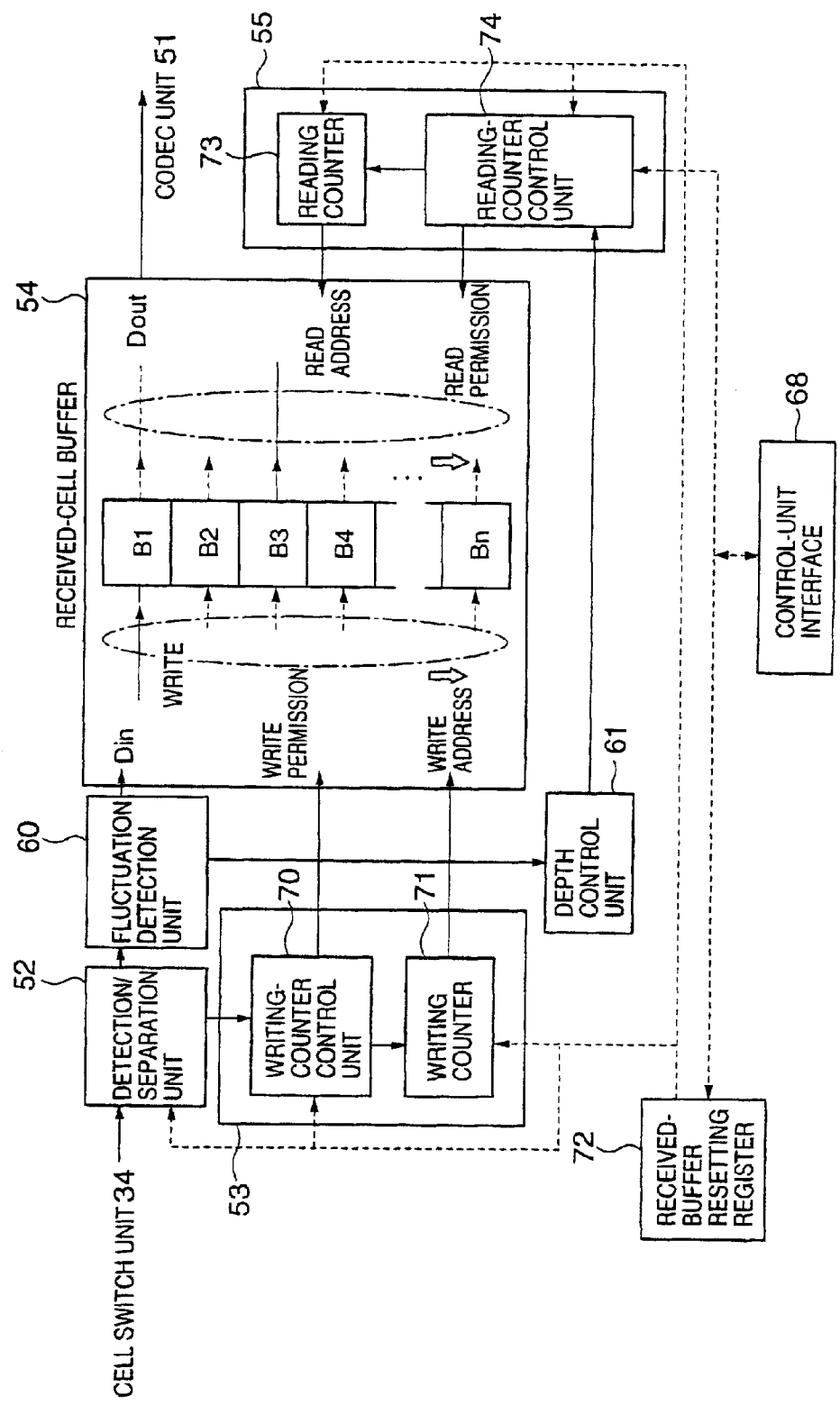
FIG. 6 is a block diagram showing a data reading control executed on a received-cell buffer.
Figure 7:
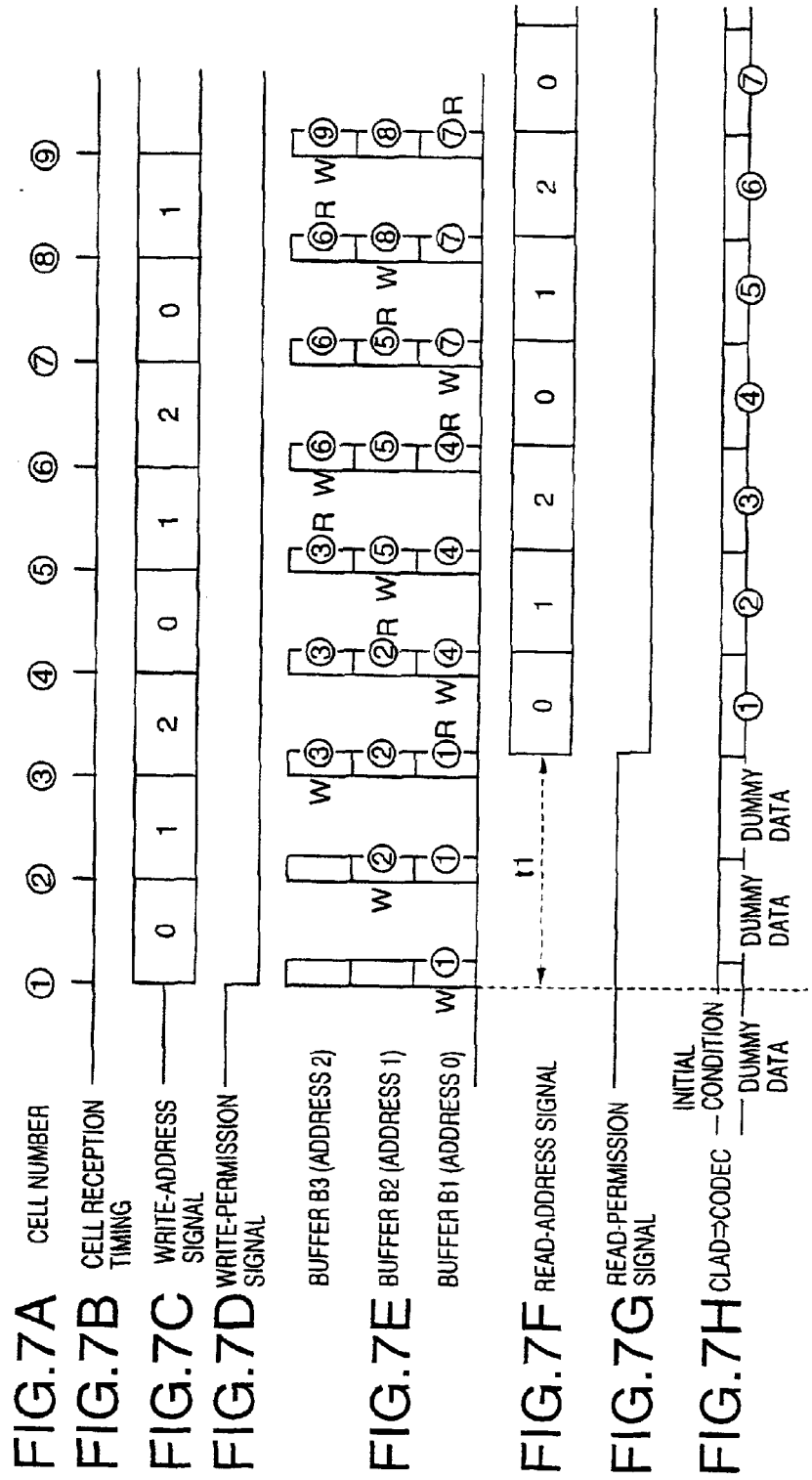
FIGS. 7A through 7H are diagrams showing timings of signals supplied to the received-cell buffer.

A description will now be given of a data reading control executed on the received-cell buffer 54 with reference to FIG. 6. FIG. 6 is a block diagram showing the data reading control executed on the received-cell buffer 54. Additionally, FIGS. 7A through 7H are diagrams showing timings of signals supplied to the received-cell buffer 54. It should be noted that units or parts unnecessary for explaining the data reading control executed on the received-cell buffer 54 are omitted from FIGS. 6 and 7A through 7H. In addition, FIGS. 7A through 7H show the timings of the signals in a case in which a depth of the received-cell buffer 54 is "3", and cells are transmitted from the cell switch 34 to the CODEC-CLAD unit 35 in equal time intervals as shown in FIG. 7B.

The cell-header detection and separation unit 52 detects a cell supplied from the cell switch unit 34. In a case of detecting the cell for the first time, the cell-header detection and separation unit 52 supplies information indicating the first detection of the cell to a writing-counter control unit 70 and a writing counter 71 included in the received-cell-buffer writing control unit 53. The writing-counter control unit 70, after receiving the information indicating the first detection of the cell, sets a write-permission signal supplied to the received-cell buffer 54 enable as shown in FIG. 7D as well as sets a count-permission signal supplied to the writing counter 71 enable. The writing counter 71 supplies a write-address signal shown in FIG. 7C to the received-cell buffer 54 when the count-permission signal is enabled.

In addition, the cell-header detection and separation unit 52 separates a cell payload part of the cell received from the cell switch unit 34, and supplies the cell payload part to the received-cell-fluctuation detection unit 60. The received-cell-fluctuation detection unit 60 separates a received-buffer-depth control area from the cell payload part received from the cell-header detection and separation unit 52, and supplies the received-buffer-depth control area to the received-cell-buffer depth-setting control unit 61. Additionally, the received-cell-fluctuation detection unit 60 supplies the cell payload part received from the cell-header detection and separation unit 52 to the receive-cell buffer 54. Cell payload parts of cells 1 through 9 shown in FIG. 7A supplied one by one from the cell switch unit 34 are stored in buffers B1, B2 and B3 of the received-cell buffer 54 sequentially as shown in FIG. 7E, following write-address signals 0, 1 and 2 shown in FIG. 7C.

When receiving the received-buffer-depth control area from the received-cell-fluctuation detection unit 60, the received-cell-buffer depth-setting control unit 61 analyzes a maximum delay fluctuation value stored in the received-buffer-depth control area, and sets a depth of the received-cell buffer 54. Subsequently, the received-cell-buffer depth-setting control unit 61 delays timing to start reading data according to the depth of the received-cell buffer 54, and supplies the delayed timing to a reading-counter control unit 74 included in the received-cell-buffer reading control unit 55.

The reading-counter control unit 74, after receiving the delayed timing from the received-cell-buffer depth-setting control unit 61, enables a read-permission signal supplied to the received-cell buffer 54 as shown in FIG. 7G as well as enables a count-permission signal supplied to a reading counter 73. The reading counter 73 supplies a read-address signal shown in FIG. 7F to the received-cell buffer 54 when the count-permission signal is enabled. In FIG. 7F, a time "t1" taken from a moment when the write-permission signal shown in FIG. 7D is enabled to a moment when the read-permission signal shown in FIG. 7F is enabled corresponds to the maximum delay fluctuation value stored in the received-buffer-depth control area. In other words, the received-cell-buffer depth-setting control unit 61 sets the depth of the received-cell buffer 54 corresponding to the maximum delay fluctuation value stored in the received-buffer-depth control area, and then delays timing to enable the read-permission signal, corresponding to the depth of the received-cell buffer 54.

As shown in FIG. 7H, the cells 1 through 9 stored in the buffers B1, B2 and B3 of the received-cell buffer 54 are read therefrom in order, following read-address signals 0, 1 and 2 shown in FIG. 7F. It should be noted that letters "W" and "R" indicate respectively an operation to write cells to the buffer B1, B2 and B3, and an operation to read the cells from the buffer B1, B2 and B3. Subsequently, the cells read from the received-cell buffer 54 are supplied to the CODEC unit 35. A received-buffer resetting register 72 shown in FIG. 6 resets the writing-counter control unit 70, the writing counter 71, the reading counter 73 and the reading-counter control unit 74 when a new cell transmission starts.

Accordingly, a maximum delay fluctuation value of a cell transmission path can be easily set by a method of adding maximum delay fluctuation values of components of the cell transmission path to a predetermined area of a cell. In addition, the maximum delay fluctuation value of the cell transmission path can be absorbed by a method of controlling timing to read a stored cell following the maximum delay fluctuation value of the cell transmission path stored in the predetermined area of the cell. To be concrete, the maximum delay fluctuation value of the cell transmission path can be absorbed by a method of delaying the timing to read the stored cell following the maximum delay fluctuation value of the cell transmission path stored in the predetermined area of the cell.

Figure 8:
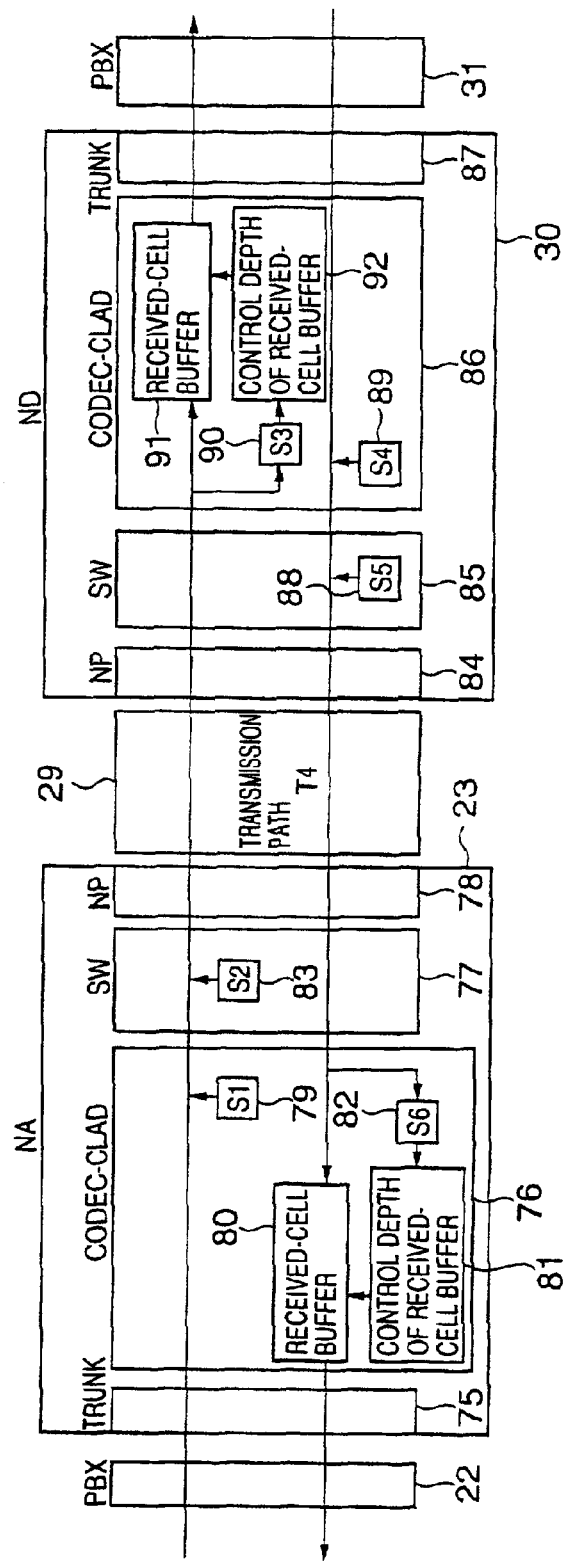
FIG. 8 is a block diagram showing a first embodiment of a method of controlling absorption of delay fluctuation of data transmitted through a transmission path according to the present invention.
Figure 9:
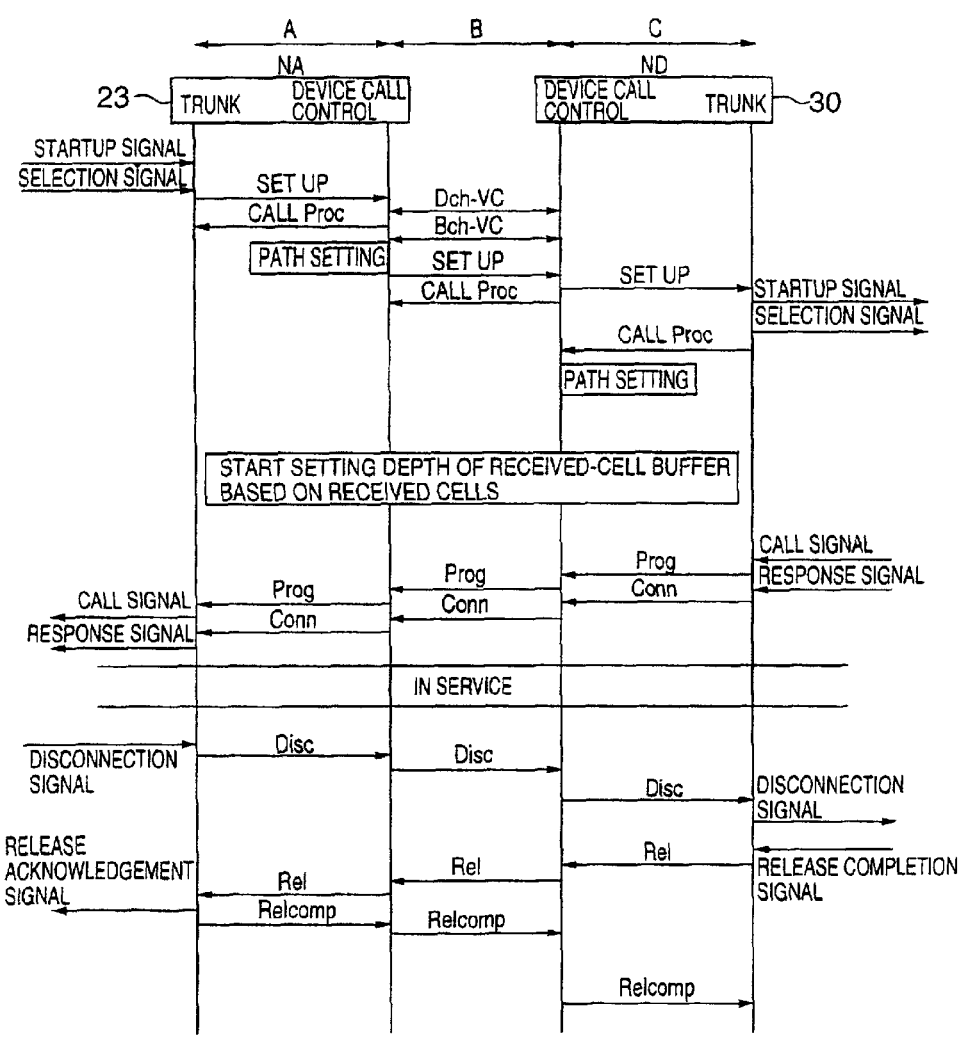
FIG. 9 is a sequence diagram showing steps taken for setting a sound transmission path 3.

A description will now be given of processes performed in a case of setting the sound transmission path 3 shown in FIG. 2, with reference to FIGS. 8 and 9. FIG. 8 is a block diagram showing a first embodiment of a method of controlling absorption of delay fluctuation of data transmitted through a transmission path according to the present invention. Additionally, FIG. 9 is a sequence diagram showing steps taken for setting the sound transmission path 3. In FIG. 9, a section between a trunk (trunk interface) 75 of the cell multiplexer 23 shown in FIG. 2 and a device call control of the cell multiplexer 23 is named a control section A. Additionally, a section between the device call control of the cell multiplexer 23 and a device call control of the cell multiplexer 30 shown in FIG. 2 is named a control section B. Additionally, a section between the device call control of the cell multiplexer 30 and a trunk 87 of the cell multiplexer 30 is named a control section C. Call setting sequences of the control sections A, B and C are executed following a Q. 931a advice.

When the telephone set 21 calls the PBX 22, the PBX 22 transmits a startup signal indicating a condition in which a receiver of the telephone set 21 is picked up and a selection signal indicating a dial number to the trunk 75 of the cell multiplexer 23. Subsequently, the trunk 75 transmits a SETUP signal to the device call control of the cell multiplexer 23 after receiving both the startup signal and the selection signal. The device call control of the cell multiplexer 23 returns a Call-Proc signal indicating reception of the SETUP signal to the trunk 75 after receiving the SETUP signal from the trunk 75. As described above, a path setting of the control section A inside the cell multiplexer 23 is completed.

Additionally, when the device call control of the cell multiplexer 23 receives the SETUP signal from the trunk 75, a path setting of the control section B is executed as follows. A Dch-VC (Virtual Channel) path used for transmitting or receiving a control signal through the control section B and a Bch-VC path used for transmitting or receiving a data signal through the control section B are initially set. Subsequently, the device call control of the cell multiplexer 23 transmits the SETUP signal to the device call control of the cell multiplexer 30. When receiving the SETUP signal from the device call control of the cell multiplexer 23, the device call control of the cell multiplexer 30 returns the Call-Proc signal to the device call control of the cell multiplexer 23. Consequently, the path setting of the control section B is completed.

Additionally, when the device call control of the cell multiplexer 30 receives the SETUP signal from the device call control of the cell multiplexer 23, a path setting of the control section C is executed as follows. The device call control of the cell multiplexer 30 transmits the SETUP signal to the trunk 87 of the cell multiplexer 30 after receiving the SETUP signal from the device call control of the cell multiplexer 23. After receiving the SETUP signal from the device call control of the cell multiplexer 30, the trunk 87 of the cell multiplexer 30 returns the Call-Proc signal to the device call control. Accordingly, the path setting of the control section C is completed. As a result, path settings of the control sections A, B and C are completed, thereby enabling bi-directional transmission or receptions of cells between the cell multiplexer 23 and the cell multiplexer 30.

Subsequently, settings of a maximum delay fluctuation value of the sound transmission path 3 and a depth of a received-cell buffer are controlled by the method of controlling absorption of delay fluctuation of data transmitted through a transmission path according to the present invention. According to the method, at a step S1 shown in FIG. 8, a cell fluctuation-value insertion unit 79 included in a CODEC-CLAD unit 76 of the cell multiplexer 23 adds a maximum delay fluctuation value of the CODEC-CLAD unit 76 to a received-buffer-depth control area included in a payload part of a cell that is to be transmitted from the cell multiplexer 23 to the cell multiplexer 30. Additionally, at a step S2, a cell fluctuation-value insertion unit 83 included in a cell switch unit 77 of the cell multiplexer 23 adds a maximum delay fluctuation value of the cell switch unit 77 and a maximum delay fluctuation value of the transmission path 29 to the received-buffer-depth control area of the cell. Subsequently, the cell is transmitted from the cell multiplexer 23 through the transmission path T4 to the cell multiplexer 30. At a step S3, in the cell multiplexer 30, a received-cell-buffer depth-setting control unit 90 adds a maximum delay fluctuation value of the cell multiplexer 30 to a maximum delay fluctuation value stored in the received-buffer-depth control area of the cell received from the cell multiplexer 23. The received-cell-buffer depth-setting control unit 90, then, controls setting of a depth of a received-cell buffer 91 included in the cell multiplexer 30. Similarly, at steps S4, S5 and S6, maximum delay fluctuation values are added to a received-buffer-depth control area of a cell transmitted from the cell multiplexer 30 to the cell multiplexer 23. Subsequently; a received-cell-buffer depth-setting control unit 82 of the cell multiplexer 23 controls setting of a depth of a received-cell buffer 80 included in the cell multiplexer 23 by use of a maximum delay fluctuation value stored in the received-buffer depth control area of the cell.

A cell multiplexer located on a selected sound transmission path can determine a maximum delay fluctuation value of the selected sound transmission path after receiving several cells, for instance, two or three cells, correctly. Additionally, the cell multiplexer can control setting of a depth of a received-cell buffer included in the cell multiplexer by use of a determined maximum delay fluctuation value. Thus, according to the method of controlling absorption of delay fluctuation of data transmitted through a transmission path, the depth of the received-cell buffer can be set in a very short period, in other words, before voice communication starts between a telephone set on a transmitting end and a telephone set on a receiving end. It should be noted that the depth of the received-cell buffer is set only once for each call in the above-described method.

The trunk 87 of the cell multiplexer 30 transmits the startup signal and the selection signal to the PBX 31 after receiving the SETUP signal from the device call control of the cell multiplexer 30. The PBX 31 transmits a cal signal to the cell multiplexer 30 if there is a telephone set on the receiving end, for example, the telephone set 32. After receiving the call signal from the PBX 31, the cell multiplexer 30 outputs a "Prog" signal toward the cell multiplexer 23 following the call signal. The Prog signal is then supplied to the telephone set 21 through the control sections C, B and A, and the PBX 22. After the telephone set 21 on the transmitting end receives the Prog signal, a ringing tone comes out of the receiver of the telephone set 21. It should be noted that the following command signals are passed through each of the control sections A, B and C without being used.

When a user of the telephone set 32 on the receiving end picks up a receiver of the telephone set 32, the PBX 31 transmits a response signal to the trunk 87 of the cell multiplexer 30. The cell multiplexer 30 outputs a "Conn" signal toward the cell multiplexer 23 after receiving the response signal from the PBX 31. The Conn signal is supplied to the trunk 75 of the cell multiplexer 23. Subsequently, the trunk 75 transmits the response signal to the PBX 22 following the Conn signal. Consequently, a communication path between the telephone set 21 and the telephone set 32 is established.

If the receiver is placed in a position after communication ends, the PBX 22 transmits a disconnection signal to the trunk 75 of the cell multiplexer 23. After receiving the disconnection signal from the PBX 22, the trunk 75 outputs a "Disc" signal toward the cell multiplexer 30 following the disconnection signal. The Disc signal is supplied to the trunk 87 of the cell multiplexer 30 through the control sections A, B and C. Subsequently, the trunk 87 transmits the disconnection signal to the PBX 31 following the Disc signal. After receiving the disconnection signal from the trunk 87, the PBX 31 supplies a release completion signal to the trunk 87. The trunk 87 outputs a "Rel" signal toward the cell multiplexer 23 following the release completion signal. The Rel signal is supplied to the trunk 75 of the cell multiplexer 23 through the control sections C, B and A. Subsequently, the trunk 75 transmits a release acknowledgement signal to the PBX 22 as well as transmits a "Relcomp" signal to the trunk 87 of the cell multiplexer 30 through the control sections A, B and C. Consequently, disconnection of the communication path set through the control sections A, B and C is completed.

Figure 10:
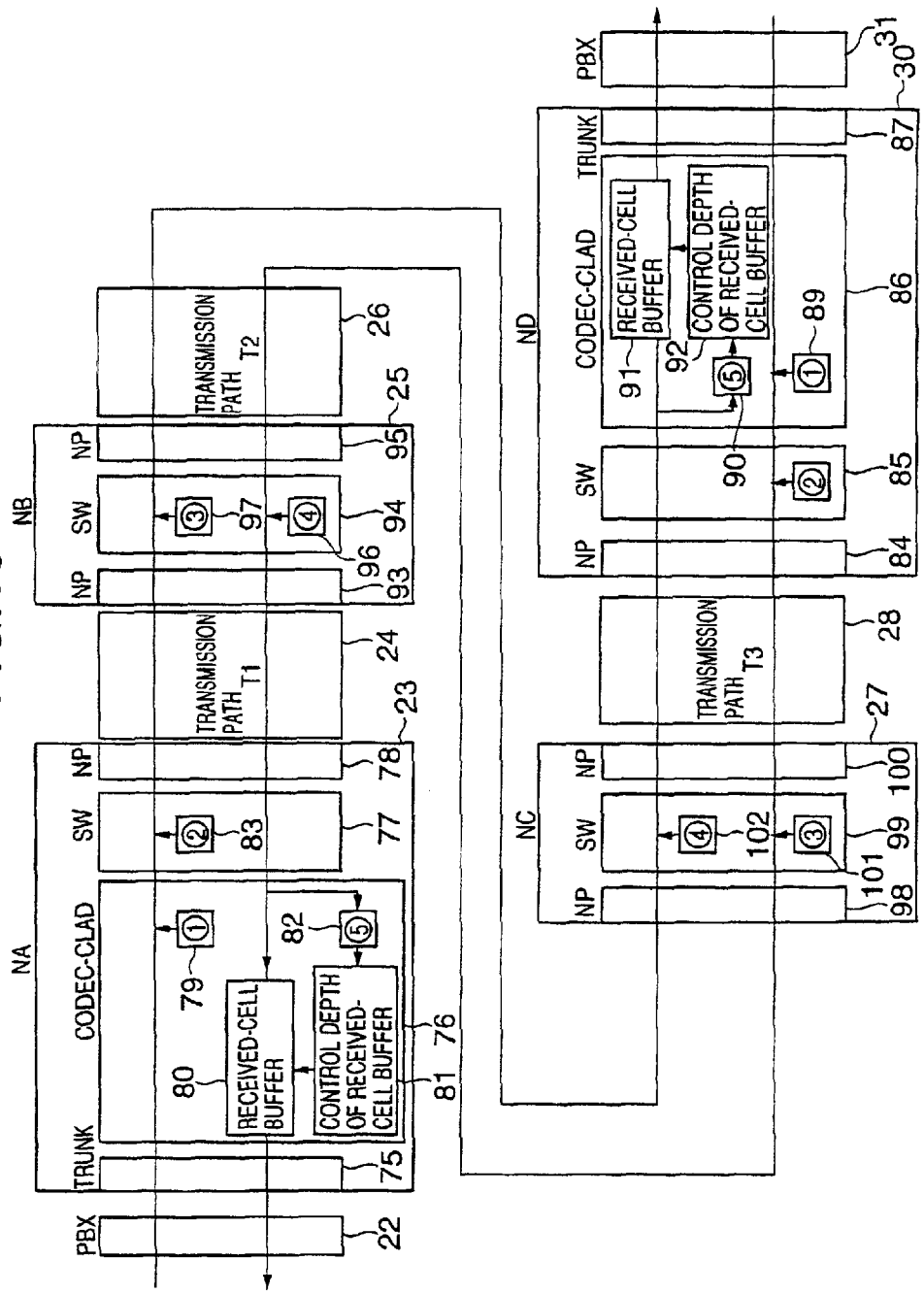
FIG. 10 is a block diagram showing a second embodiment of the method of controlling absorption of delay fluctuation of data transmitted through a transmission path according to the present invention.
Figure 11:
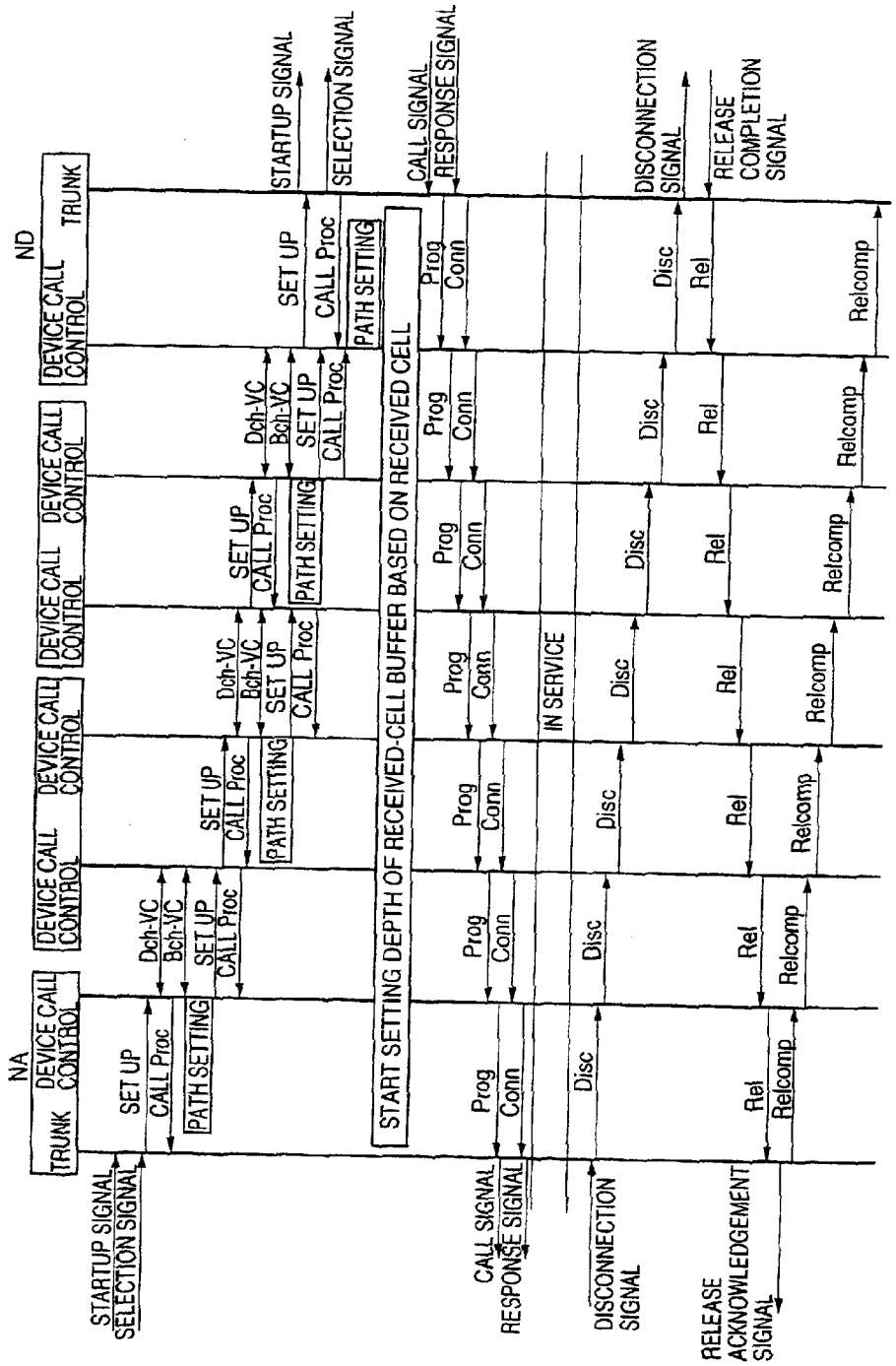
FIG. 11 is a sequence diagram showing steps taken for setting a sound transmission path 4.

A description will now be given of processes performed in a case of setting the sound transmission path 4 shown in FIG. 2, with reference to FIGS. 10 and 11. FIG. 10 is a block diagram showing a second embodiment of the method of controlling absorption of delay fluctuation of data transmitted through a transmission path according to the present invention. Additionally, FIG. 11 is a sequence diagram showing steps taken for setting the sound transmission path 4. The processes performed for setting the sound transmission path 4 is almost equivalent to the processes performed for setting the sound transmission path 3 except that the processes performed for setting the sound transmission path 4 includes additional processes performed by the cell multiplexers 25 and 27 as relay stations. Each of the cell multiplexers 25 and 27 does not include a CODEC-CLAD unit, and thus does not add a maximum delay fluctuation value of the CODEC-CLAD unit to a received-buffer-depth control area of a cell received through the sound transmission path 4. In other words, the cell multiplexer 25 only adds a maximum delay fluctuation value of a cell switch unit 94 and a maximum delay fluctuation value of the transmission path 26 to the received-buffer-depth control area of the cell transmitted through the sound transmission path 4 by using cell fluctuation-value insertion units 96 and 97. Similarly, the cell multiplexer 27 adds a maximum delay fluctuation value of a cell switch unit 99 and a maximum delay fluctuation value of the transmission path 28 to the received-buffer-depth control area of the cell by using cell fluctuation-value insertion units 101 and 102. The other parts of the processes performed for setting the sound transmission path 4 is equal to the processes for setting the sound transmission path 3, and thus a description about the other parts is omitted.

According to the first or second embodiments of the method of controlling absorption of delay fluctuation of data transmitted through a transmission path, a maximum delay fluctuation value of a cell transmission path can be easily set even if a network or the cell transmission path is modified, because of addition of a maximum delay fluctuation value of each relay station and of a path to its adjacent relay station to a predetermined area of a cell at each relay station. Additionally, the maximum delay fluctuation value of the cell transmission path can be easily set at once by transmission of several cells through a cell multiplexer. By setting a delay period for reading data from the cell only once corresponding to the maximum delay fluctuation value of the cell transmission path after setting the cell transmission path, maximum delay fluctuation possibly occurring on the cell transmission path can be certainly absorbed, and thus the delay period for reading the data from the cell does not need to be modified during a cell transmission or reception. Accordingly, destruction of the cell can be avoided. Especially in a case in which a sound signal made into cells is transmitted through the cell transmission path, decrease in sound quality caused by the destruction of the cell can be avoided.

As described above, the present invention enables a setting of a maximum delay fluctuation value corresponding to a selected path by adding maximum delay fluctuation values of transmission paths and devices where a cell is transmitted through. Accordingly, the present invention enables an automatic and fast setting of the maximum delay fluctuation value of the selected path, thereby enabling a setting of the most appropriate depth of a received-cell buffer by following the maximum delay fluctuation value of the selected path.

According to the present invention, a maximum delay fluctuation value of a cell transmission path can be easily set by a method of adding maximum delay fluctuation values of components of the cell transmission path to a predetermined area of a cell. In addition, the maximum delay fluctuation value of the cell transmission path can be absorbed by a method of controlling timing to read a stored cell following the maximum delay fluctuation value of the cell transmission path stored in the predetermined area of the cell.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-156442, filed on May 26, 2000, the entire contents of which are hereby incorporated by reference.

What is claimed is:

1. A multiplexer transmitting data as a cell through a cell transmission path, said multiplexer comprising:

a first delay-fluctuation adding unit adding a first maximum value of delay fluctuation occurring when said multiplexer transmits the cell, to a predetermined area of the cell;

a second delay-fluctuation adding unit adding a second maximum value of delay fluctuation occurring when said multiplexer reproduces the data from the cell, to said predetermined area, obtaining a maximum delay fluctuation value designating the total fluctuation time of the cell transmission path;

a storage unit storing a data portion of the cell to be reproduced; and a data-read control unit controlling reading said data portion stored in said storage unit, wherein data read from said storage unit is delayed by an interval equal to said maximum delay fluctuating value.

2. The multiplexer as claimed in claim 1, wherein said first delay-fluctuation adding unit adding said first maximum value of delay fluctuation occurring when said multiplexer transmits the cell to a next multiplexer on the cell transmission path and a third maximum value of delay fluctuation occurring on the cell transmission path between said multiplexer and said next multiplexer, to said predetermined area.

3. The multiplexer as claimed in claim 1, wherein said data-read control unit determines said maximum delay fluctuation value only once after a setting of the cell transmission path.

4. A method of controlling absorption of delay fluctuation of data transmitted as a cell through a plurality of relay stations, said method comprising the steps of:

adding a first maximum value of delay fluctuation of each relay station to a predetermined area of the cell that is to be transmitted through the plurality of relay stations;

storing a data portion of a received cell to be reproduced, in a buffer at a relay station;

adding a second maximum value of delay fluctuation cause by reproducing said data portion, to said predetermined area, obtaining a maximum delay fluctuation value designating the total fluctuation time of the plurality of relay stations; and reading said data portion of the received cell from said buffer by wherein data read from said buffer is delayed by an interval equal to said maximum delay fluctuation value, thereby absorbing the delay fluctuation of the received cell.

5. The method as claimed in claim 4 comprising the step of adding the maximum value of delay fluctuation to said predetermined area of the cell at each relay station.

* * * * *